United States Patent
Inagaki

[11] Patent Number: 5,126,179
[45] Date of Patent: Jun. 30, 1992

[54] DISK SUBSTRATE FOR MAGNETIC DISK

[75] Inventor: Hirosuke Inagaki, Tokyo, Japan

[73] Assignee: NKK Corporation, Tokyo, Japan

[21] Appl. No.: 657,505

[22] Filed: Feb. 19, 1991

[30] Foreign Application Priority Data

Feb. 23, 1990 [JP] Japan ................... 2-42890

[51] Int. Cl.⁵ .............................. G11B 23/00
[52] U.S. Cl. ............................. 428/64; 428/694
[58] Field of Search .......... 428/64, 65, 694, 900

[56] References Cited

U.S. PATENT DOCUMENTS 4,808,455  2/1989  Wada et al. ............ 428/64
4,876,117  10/1989  Bornstein ............... 428/64

Primary Examiner—Paul J. Thibodeau
Assistant Examiner—Leszek Kiliman

[57] ABSTRACT

A magnetic disk substrate contains Ti as main constituent, and O and Al as additive constituents. A mounts of O and Al falls within the range which satisfies $O \leq 0.6$, $Al \leq 4$, and $2.5 \geq O + Al/3 \geq 1$ (wt. %). The balance consists of Ti and unavoidable impurities.

17 Claims, 1 Drawing Sheet 5,126,179

DISK SUBSTRATE FOR MAGNETIC DISK

BACKGROUND OF THE INVENTION

1. Field of the Invention

The present invention relates to a magnetic disk substrate for use in a high-density recording/reproducing magnetic disk to be used in a computer or the like.

2. Description of the Related Art

A magnetic disk as a recording medium for a computer is constituted by a substrate and a magnetic film formed on the substrate, and the substrate is required to have the following characteristics.

(1) The substrate must be precisely polished so that a magnetic head can stably move on a disk.

(2) The substrate must be free from cracks or steps which may cause a defect in a magnetic film when the magnetic film is formed on its surface.

(3) The substrate must withstand heating performed during formation of a magnetic film.

(4) The substrate must have a satisfactory hardness which can prevent the substrate from being damaged or abraded when it is brought into contact with a magnetic head.

(5) The substrate must be light in weight and non-magnetic.

As a substrate material which satisfies the above requirements, an aluminum alloy such as an Al-Mg alloy has been conventionally used. In conventional techniques, Ni-P plating or the like is performed to harden the surface of a substrate and to cover an inclusion which causes a magnetic film defect Masahiro Saito et al., Jitsumu Hyomen Gijutsu (Practical Surface Techniques), Vol. 35 (1988), No. 6.

In addition, glass (Hiroyoshi Ishizaki, "Industrial Material", Vol. 35, No. 5), titanium (Published Unexamined Japanese Patent Application Nos. 52-105804, 59-151335, and 1-112521), and the like are developed as the substrate material.

Substrates consisting of the aluminum alloy, glass, and titanium described above, however, respectively have the following problems.

(1) Aluminum Alloy

Since an aluminum alloy is a soft material, the surface of a substrate consisting of the aluminum alloy must be hardened by Ni-P plating as described above. It is, however, difficult to uniformly perform such an electrochemical treatment throughout a wide region of the substrate. In particular, the Ni-P plating easily causes a plating failure. In addition, a magnetic film is generally formed by sputtering, and the substrate is heated during the sputtering. When the Ni-P plating layer is formed on the surface of the substrate, the Ni-P plating layer is crystallized to be magnetic or to easily cause peeling if the substrate temperature exceeds 300° C. upon sputtering. Therefore, the temperature during the sputtering must be limited to be 300° C. or less. Furthermore, a demand has recently arisen for a smaller thickness of a magnetic disk and a higher rotational speed. Since the aluminum alloy essentially has low strength and stiffness, it cannot sufficiently satisfy these requirements.

(2) Glass

Although glass has no problem in heat resistance as a substrate material, it is essentially a brittle material and therefore is easily broken. In addition, when a temperature is increased during sputtering, glass releases gas components, and an impurity in glass is diffused into a magnetic film, thereby degrading the magnetic characteristics of the magnetic film.

(3) Titanium

Although titanium is free from the above drawbacks of the aluminum alloy and glass and therefore expected to be promising as a magnetic disk substrate, the techniques described in the patent applications cited above have the following problems.

That is, Published Unexamined Japanese Patent Application No. 52-105804 discloses a technique of oxidizing or nitriding the surface of Ti to increase its surface hardness, thereby improving polishing properties to obtain good surface conditions and a high abrasion resistance. However, since it is difficult to form such a film having a uniform thickness throughout a wide region, the manufacturing yield is decreased to increase the manufacturing cost. Published Unexamined Japanese Patent Application Nos. 59-151335 and 1-112521 disclose disk substrates consisting of Ti-5Al-2.5Sn, Ti-6Al-4V, and Ti-15V-3Cr-3Al-3Sn alloys. However, since these titanium alloys contain an expensive alloy element at a high concentration, the manufacturing cost is increased. In addition, any of these titanium alloys has poor cold rolling properties (Nishimura; "Kobe Steel Ltd. Technical Reports 32 (1982)", No. 129, page 44) and therefore causes edge cracking upon cold rolling. Since a thin plate such as a disk substrate is broken by cracks, it is practically impossible to manufacture a disk substrate consisting of the titanium alloy by cold rolling. For this reason, a thin plate such as a disk substrate consisting of an alloy of this type is manufactured by hot rolling in accordance with a pack rolling method (Suenaga; "NKK Technical Reports (1987)", No. 127, page 37). A disk substrate manufactured by this method, however, is very expensive.

As described above, no magnetic disk substrate which can satisfy the market's needs in terms of both performance and manufacturing cost has been developed yet.

SUMMARY OF THE INVENTION

The present invention has been made in consideration of the above situation and has as its object to provide a magnetic disk substrate which consists of an inexpensive material, can be manufactured by cold rolling, has a high abrasion resistance and a high surface flatness, and can be made thinner and withstand high-speed rotation.

According to the present invention, there is provided a magnetic disk substrate containing O and Al in amounts falling within a range which satisfies $O \leq 0.6$, $Al \leq 4$, and $2.50 + Al/3 \geq 1$ (wt %), wherein the balance essentially consists of Ti.

In this manner, a magnetic disk substrate having the following excellent characteristics can be obtained by adding small amounts of Al and O as inexpensive elements to titanium (1) The magnetic disk substrate has a sufficient hardness and a high abrasion resistance upon contact with a magnetic head.

(2) Since the magnetic disk substrate can be subjected to cold rolling and has good rolling properties, a high flatness which is an essential property of a disk substrate can be obtained, and a manufacturing cost can be decreased.

(3) Since formation of steps caused by deformation twins and crystal grain boundaries can be prevented upon polishing, good surface conditions can be obtained.

(4) Since the magnetic disk substrate has a high strength, it can be subjected to high-speed rotation. Furthermore, since the magnetic disk substrate essentially has an excellent heat resistance in addition to the high strength, it is not deformed even if a temperature upon sputtering is high.

Additional objects and advantages of the invention will be set forth in the description which follows, and in part will be obvious from the description, or may be learned by practice of the invention. The objects and advantages of the invention may be realized and obtained by mean of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

The FIGURE is a graph showing a relationship between the contents of Al and O as additional elements with respect to titanium and the substrate characteristics.

DETAILED DESCRIPTION OF THE PREFERRED EMBODIMENTS

Figure 1:
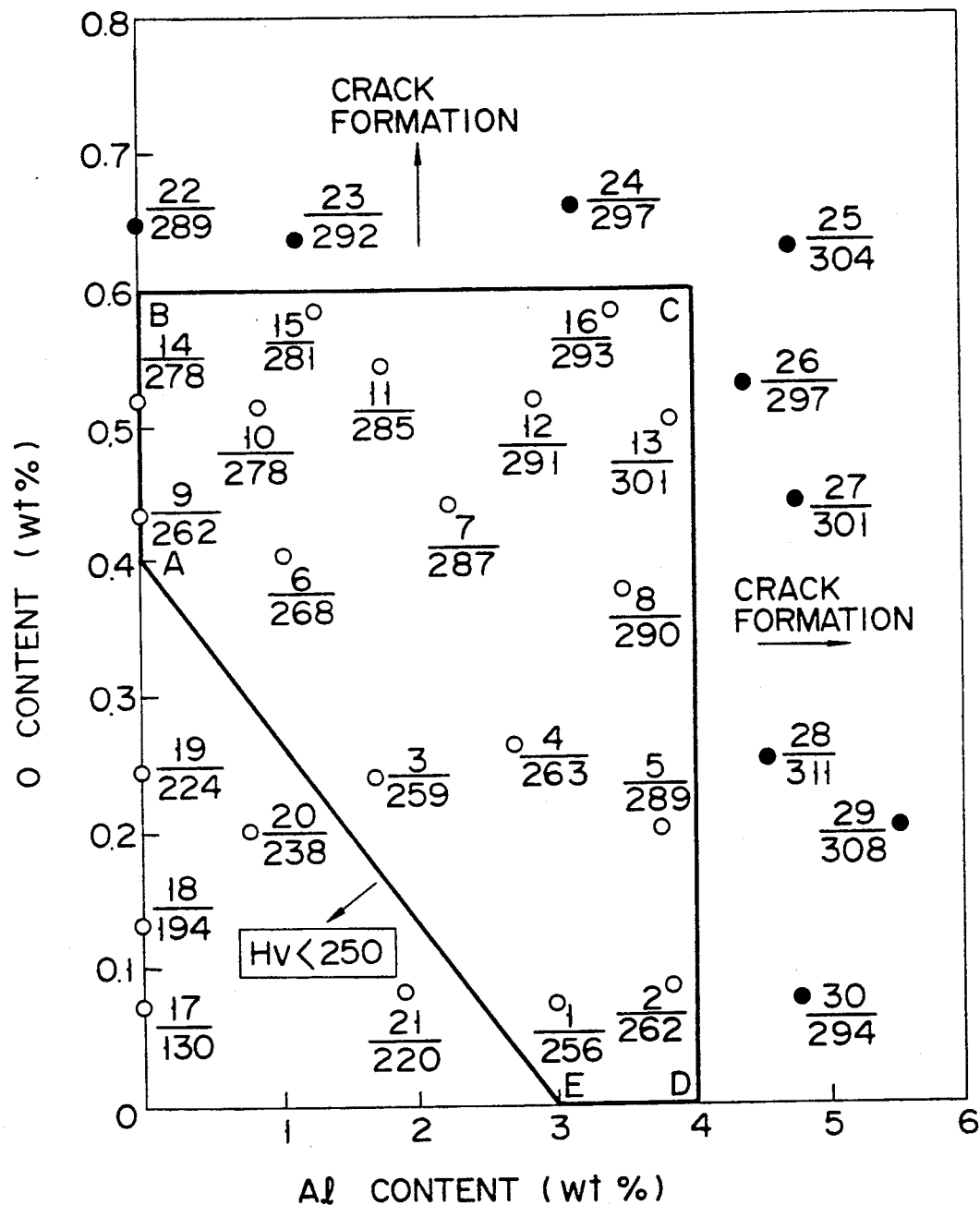

A magnetic disk substrate according to the present invention contains O and Al in amounts within a region (including lines) surrounded by coordinate points (indicated by wt %) A (0, 0.4), B (0, 0.6), C (4, 0.6), D (4, 0), and E (3, 0) and the balance essentially consisting of Ti.

In the present invention, titanium which essentially has a high stiffness and a high heat resistance is used as a main component, and at least one of Al and O as inexpensive elements can be added within a predetermined range to titanium. As a result, a magnetic disk substrate which can achieve the above object can be provided.

More specifically, the following effects are obtained:

(1) Since these elements are not only inexpensive but also can increase a strength to improve an abrasion resistance, the strength and the abrasion resistance of a substrate can be increased at a low cost by adding these elements. Therefore, a substrate hardening treatment need not be performed, and the substrate can be made thinner. In addition, the stiffness of the substrate can be maintained due to these characteristics even if a temperature is increased upon sputtering, and a limitation as to the sputtering temperature can be eliminated.

(2) Cold rolling properties and the flatness of a rolled plate can be improved by adding the elements. Therefore, a magnetic disk substrate can be manufactured by cold rolling at a low cost, and the surface roughness of the substrate obtained after mirror surface polishing can be easily controlled to be less than an upper limit of 0.02 μm.

(3) Since a crystal grain size obtained after cold rolling and annealing is controlled to be 30 μm or less, steps are not easily formed between crystal grains upon mirror surface polishing of a substrate. In addition, since Al and O suppress formation of deformation twins upon mirror surface polishing, steps caused by the twins are rarely formed. By these effects, a smooth surface preferred as a substrate free from polishing damages and unevenness can be easily obtained.

If O and Al fall within the range of $2.5\,O + Al/3 < 1$ (a region surrounded by O, A, and E in FIG. 1), since the addition effect of O and Al is too insignificant, a Vickers hardness Hr is less than 250, i.e., the hardness is unsatisfactory. If $O > 0.6$ or $Al > 4$, cracks are easily formed during cold rolling.

The contents of O and Al are therefore defined as described above.

EXAMPLES

The present invention will be described in more detail below by way of its examples.

Titanium alloys having compositions shown in Table 1 were VAR-melted and hot-forged at 1,000° C. to manufacture 16-mm thick slabs. Subsequently, these slabs were hot-rolled at 800° C. to obtain 5-mm thick hot-rolled plates. The obtained plates were subjected to scale removal by coil grinding to form 3.4-mm thick plates, and the formed plates were subjected to 70% cold rolling to obtain 1.5-mm thick cold-rolled plates. Note that in Table 1, composition Nos. 1 to 16 indicate examples falling within the range of the present invention, and composition Nos. 17 to 30 indicate comparative examples falling outside the range.

Table 1 shows whether cracks are formed or not formed during the above cold rolling.

Vacuum annealing was performed for the obtained cold-rolled plates at 630° C. for one hour, and the Vickers hardness of each plate was measured (load = 1 kg, an average value of five-point measurement). Subsequently, disks each having an outer diameter of 95 mm and an inner diameter of 25 mm were punched out from the cold-rolled plates, and the surfaces of the punched disks were sequentially polished by using grindstones of #400, #800, #1,500, and #4,000 (# is JIS (Japanese Industrial Standard) mesh number) and finally polished by alumina grinding grains. A differential interfering microscope was used to check whether deformation twins were formed on the disk surfaces upon polishing. In addition, measurement of a surface roughness $R_{max}$ and evaluation of an abrasion resistance were performed. Note that the evaluation of an abrasion resistance was performed at a rotational speed of 500 rpm for a sliding time of 24 hours, and examples having high abrasion resistances are indicated by symbols "o" and those having low abrasion resistances are indicated by symbols "x".

Table 1 also shows the Vickers hardness, the presence/absence of deformation twins, the surface roughness, and the abrasion resistance.

TABLE 1

| | Composition No. | Chmical Composition (wt %) | | | | Cracks During Cold Rolling | Vickers hardness | Deformation Twins | Surface Roughness (mm) | Abrasion Resistance |
|---|---|---|---|---|---|---|---|---|---|---|
| | | Al | O | C | Ni | | | | | |
| Example | 1 | 3.0 | 0.075 | 0.04 | 0.015 | Not Formed | 256 | Not Formed | 0.02 | o |
| ple | 2 | 3.8 | 0.081 | 0.05 | 0.014 | Not Formed | 262 | Not Formed | 0.02 | o |

TABLE 1-continued

| | Composition No. | Chmical Composition (wt %) | | | | Cracks During Cold Rolling | Vickers hardness | Deformation Twins | Surface Roughness (mm) | Abrasion Resistance |
|---|---|---|---|---|---|---|---|---|---|---|
| | | Al | O | C | Ni | | | | | |
| | 3 | 1.7 | 0.24 | 0.04 | 0.015 | Not Formed | 259 | Not Formed | 0.02 | c |
| | 4 | 2.7 | 0.26 | 0.04 | 0.013 | Not Formed | 263 | Not Formed | 0.02 | c |
| | 5 | 3.8 | 0.20 | 0.05 | 0.017 | Not Formed | 289 | Not Formed | 0.02 | c |
| | 6 | 1.0 | 0.41 | 0.05 | 0.016 | Not Formed | 268 | Not Formed | 0.02 | c |
| | 7 | 2.2 | 0.44 | 0.04 | 0.015 | Not Formed | 287 | Not Formed | 0.02 | o |
| | 8 | 3.5 | 0.37 | 0.06 | 0.014 | Not Formed | 290 | Not Formed | 0.02 | o |
| | 9 | 0 | 0.43 | 0.05 | 0.014 | Not Formed | 262 | Not Formed | 0.02 | o |
| | 10 | 0.8 | 0.52 | 0.04 | 0.017 | Not Formed | 278 | Not Formed | 0.02 | o |
| | 11 | 1.7 | 0.54 | 0.04 | 0.014 | Not Formed | 285 | Not Formed | 0.02 | o |
| | 12 | 2.8 | 0.52 | 0.04 | 0.017 | Not Formed | 291 | Not Formed | 0.02 | o |
| | 13 | 3.8 | 0.50 | 0.04 | 0.016 | Not Formed | 301 | Not Formed | 0.02 | o |
| | 14 | 0 | 0.52 | 0.04 | 0.015 | Not Formed | 278 | Not Formed | 0.02 | o |
| | 15 | 1.3 | 0.59 | 0.04 | 0.015 | Not Formed | 281 | Not Formed | 0.02 | o |
| | 16 | 3.4 | 0.58 | 0.04 | 0.014 | Not Formed | 293 | Not Formed | 0.02 | o |
| Comparative Example | 17 | 0 | 0.77 | 0.05 | 0.014 | Not Formed | 130 | Formed | 0.06 | x |
| | 18 | 0 | 0.13 | 0.04 | 0.014 | Not Formed | 194 | Formed | 0.05 | x |
| | 19 | 0 | 0.24 | 0.04 | 0.014 | Not Formed | 224 | Not Formed | 0.03 | x |
| | 20 | 0.7 | 0.20 | 0.06 | 0.013 | Not Formed | 238 | Not Formed | 0.03 | x |
| | 21 | 1.9 | 0.80 | 0.04 | 0.017 | Not Formed | 220 | Not Formed | 0.03 | x |
| | 22 | 0 | 0.65 | 0.05 | 0.016 | Formed | 289 | Not Formed | 0.02 | o |
| | 23 | 1.2 | 0.63 | 0.04 | 0.016 | Formed | 292 | Not Formed | 0.02 | o |
| | 24 | 3.1 | 0.66 | 0.05 | 0.015 | Formed | 297 | Not Formed | 0.02 | o |
| | 25 | 4.7 | 0.63 | 0.05 | 0.014 | Formed | 304 | Not Formed | 0.02 | o |
| | 26 | 4.4 | 0.53 | 0.04 | 0.014 | Formed | 297 | Not Formed | 0.02 | o |
| | 27 | 4.7 | 0.44 | 0.04 | 0.014 | Formed | 301 | Not Formed | 0.02 | o |
| | 28 | 4.5 | 0.25 | 0.04 | 0.014 | Formed | 311 | Not Formed | 0.02 | c |
| | 29 | 5.5 | 0.20 | 0.04 | 0.017 | Formed | 308 | Not Formed | 0.02 | o |
| | 30 | 4.7 | 0.7 | 0.04 | 0.017 | Formed | 274 | Not Formed | 0.02 | o |

In accordance with the results shown in Table 1, The FIGURE shows a relationship of the contents of Al and O with respect to the presence/absence of cracks during cold rolling and the Vickers hardness. Referring to The FIGURE, the upper numerals in each plot indicate a composition No. and its lower numerals indicate the Vickers hardness. In addition, a region surrounded by A (0, 0.4), B (0, 0.6), C (4, 0.6), D (4, 0), and E (3, 0) of the Al-O coordinate system shown in FIG. 1 is the range of the present invention.

As is apparent from Table 1 and FIG. 1, in each of composition Nos. 1 to 16 falling within the range of the present invention, a value of the Vickers hardness Hv was higher than 250 which is required in consideration of an abrasion resistance, and a measured abrasion resistance was actually high. In addition, no cracks were formed during cold rolling and no deformed twined crystals were formed during polishing, resulting in excellent surface conditions having a surface roughness of 0.02 μm or less. That is, good characteristics which satisfy the characteristics required as a disk substrate were obtained.

In each of composition Nos. 17, 18, and 19 corresponding to pure Ti of the first, second, and third kinds of JIS (Japanese Industrial Standard), an abrasion resistance was low due to a low Vickers hardness, and deformation twins were locally formed during mirror surface polishing to increase a surface roughness, resulting in poor surface conditions. In each of composition Nos. 20 and 21 in which small amounts of Al were added to pure Ti, no satisfactory hardness could be obtained, resulting in unsatisfactory values in both an abrasion resistance and surface conditions. In each of composition Nos. 22 to 30 in which the content of O exceeded 0.6% or the content of Al exceeded 4%, although good results were obtained in any of a hardness, a surface roughness, and an abrasion resistance, since end face (edge) cracking was significant during cold rolling, no yield which would allow actual manufacture could be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A titanium disk substrate for a magnetic disk containing oxygen and aluminum and the balance consisting essentially of titanium, the oxygen is in an amount not more than 0.6 wt %, the aluminum is in an amount not more than 4.0 wt %, and the amount of oxygen in wt % and the amount of aluminum in wt % falls within a range which satisfies the equation $(2.5\ O + Al/3) \geq 1$, all wt. % is based on the weight of said titanium disk substrate.

2. The titanium disk substrate for a magnetic disk of claim 1, which contains, in weight %, 3.0% Al, 0.075% O, 0.04% C, and 0.015% Ni.

3. The titanium disk substrate for a magnetic disk of claim 1, which contains, in weight %, 3.8% Al, 0.081% O, 0.05% C, and 0.014% Ni.

4. The titanium disk substrate for a magnetic disk of claim 1, which contains, in weight %, 1.7% Al, 0.24% O, 0.04% C, and 0.015% Ni.

5. The titanium disk substrate for a magnetic disk of claim 1, which contains, in weight %, 2.7% Al, 0.26% O, 0.04% C, and 0.013% Ni.

6. The titanium disk substrate for a magnetic disk of claim 1, which contains, in weight %, 3.8% Al, 0.20% O, 0.05% C, and 0.017% Ni.

7. The titanium disk substrate for a magnetic disk of claim 1, which contains, in weight %, 1.0% Al, 0.41% O, 0.05% C, and 0.016% Ni.

8. The titanium disk substrate for a magnetic disk of claim 1, which contains, in weight %, 2.2% Al, 0.44% O, 0.04% C, and 0.015% Ni.

9. The titanium disk substrate for a magnetic disk of claim 1, which contains, in weight %, 3.5% Al, 0.37% O, 0.06% C, and 0.014% Ni.

10. The titanium disk substrate for a magnetic disk of claim 1, which contains, in weight %, 0.43% O, 0.05% C, and 0.014% Ni.

11. The titanium disk substrate for a magnetic disk of claim 1, which contains, in weight %, 0.8% Al, 0.52% O, 0.04% C, and 0.017% Ni.

12. The titanium disk substrate for a magnetic disk of claim 1, which contains, in weight %, 1.7% Al, 0.54% O, 0.04% C, and 0.014% Ni.

13. The titanium disk substrate for a magnetic disk of claim 1, which contains, in weight %, 2.8% Al, 0.52% O, 0.04% C, and 0.017% Ni.

14. The titanium disk substrate for a magnetic disk of claim 1, which contains, in weight %, 3.8% Al, 0.50% O, 0.04% C, and 0.016% Ni.

15. The titanium disk substrate for a magnetic disk of claim 1, which contains, in weight %, 0.52% O, 0.04% C, and 0.015% Ni.

16. The titanium disk substrate for a magnetic disk of claim 1, which contains, in weight %, 1.3% Al, 0.59% O, 0.04% C, and 0.015% Ni.

17. The titanium disk substrate for a magnetic disk of claim 1, which contains, in weight %, 3.4% Al, 0.58% O, 0.04% C, and 0.014% Ni.

* * * * *